E. BARRETT.
CAR FENDER.
APPLICATION FILED AUG. 28, 1908.
933,950.
Patented Sept. 14, 1909.
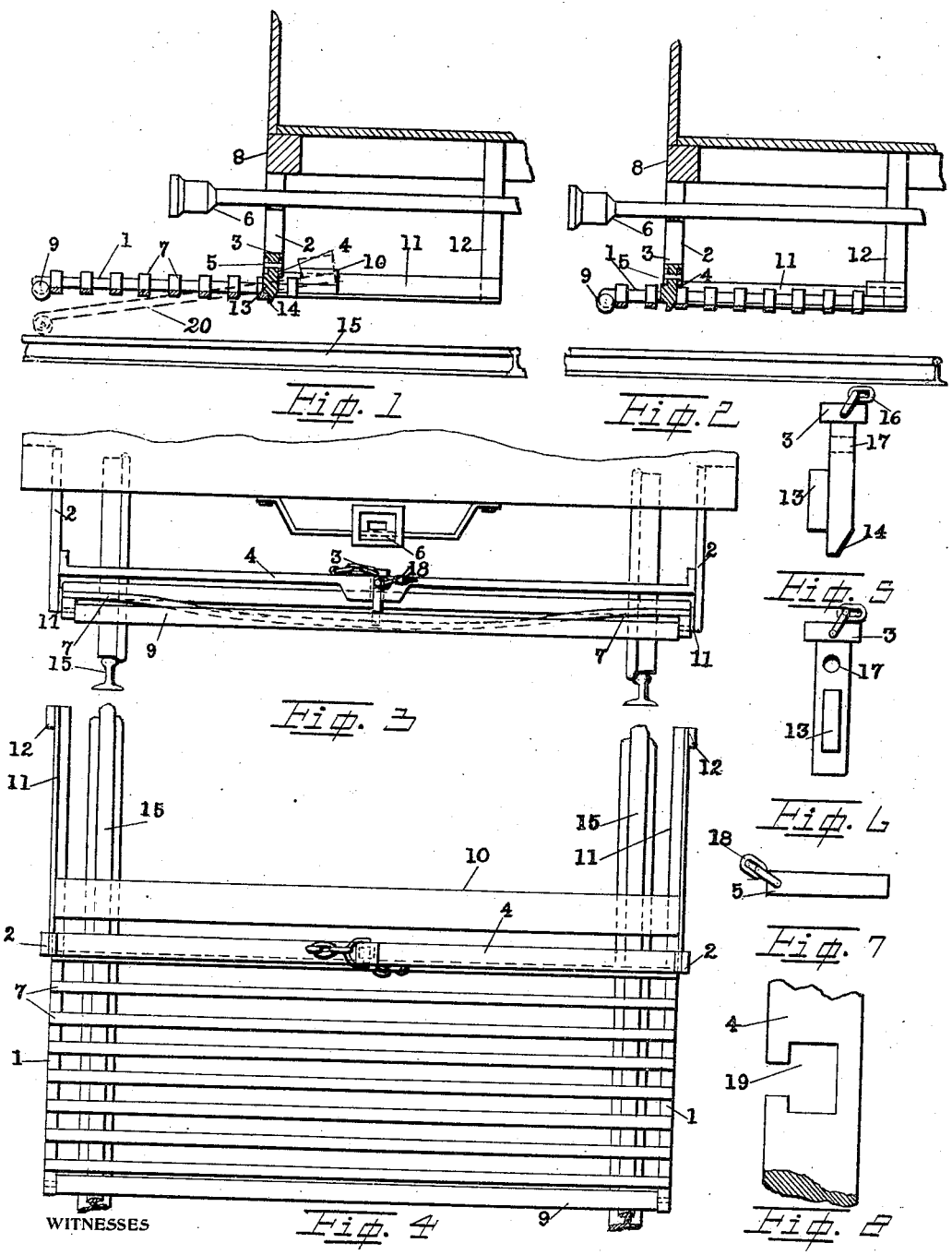
WITNESSES
John J. Burch
Ezra Ant Hill
INVENTOR
Edward Barrett,
BY
Gould & Gould
ATTORNEY

UNITED STATES PATENT OFFICE.

EDWARD BARRETT, OF PORTLAND, OREGON.

CAR-FENDER.

933,950.　　　　　　Specification of Letters Patent.　　Patented Sept. 14, 1909.

Application filed August 28, 1908. Serial No. 450,599.

*To all whom it may concern:*

Be it known that I, EDWARD BARRETT, citizen of the United States, residing at Portland, in the county of Multnomah and State of Oregon, have invented certain new and useful Improvements in Car-Fenders, of which the following is a specification.

This invention relates to improvements in car fenders and has for its object to provide a simple and effective fender which will drop close to the track when slight pressure is brought to bear on the front end, and which will not rise higher than normal.

Another object is to provide such a fender which may be easily moved back under the car and out of the way when two cars are coupled together.

These objects are attained by means of the improvements illustrated in the accompanying drawings in which, Figure 1 is a sectional elevation showing the fender in position. Fig. 2 shows the fender moved back out of the way. Fig. 3 is a front elevation. Fig. 4 is a top view of the fender with part of the car removed. Fig. 5 shows a detail of an anchor pin. Fig. 6 is another detail of the anchor pin. Fig. 7 shows a detail view of pin 5. Fig. 8 is a detail top view of a recessed portion of a cross bar wherein the anchor pin is held.

Like numerals of reference throughout the several views indicate similar parts.

Referring now to the drawings, it will be seen that the movable part of the fender consists of two side pieces 1 to which are attached, cross pieces 7 and roller 9. Said roller prevents the fender catching on the rails when said fender is tipped down as shown by the dotted lines at 20. Means for slidably holding the fender are provided by the L shaped guides 11 which are held up and attached to the car, just beneath the front end by parts 2 and 12 thus allowing the fender to be slid back as shown in Fig. 2. Cross piece 4, extending from 2 to 2 and attached thereto, is provided with a recess 19 shaped as shown in Fig. 8 for the reception of pin 3 which is shown in detail in Figs. 5 and 6. This pin is provided with a projecting portion 13 which, when the pin is in place as shown in Fig. 1, rests on one of the cross pieces 7 and therefore prevents the fender being raised without raising the pin 3. Said pin 3 is also provided with an orifice at 17 for the reception of lock pin 5, which when inserted, prevents the pin 3 being raised, thus holding the fender in place. The lower portion of pin 3 is allowed to project downwardly between two cross pieces 7 and thereby prevents the fender sliding in or out. Pin 3 is so placed in relation to guides 11 that the front end of the fender may tip down as shown dotted at 20.

In order to hold the front end of the fender up, a weight is provided at 10. This weight is just heavy enough to prevent the front end of the fender dropping to the track until a slight pressure is brought to bear thereon.

Pins 3 and 5 may be attached to 4 or to any other nearby point by chains 16 and 18 respectively, and may be removed in order to allow the fender to be slid back out of the way as shown in Fig. 2.

It is understood that slight changes may be made in the specific structure shown without departing from the spirit of the invention.

What is claimed is:

1. A car fender comprising a frame adapted for movement, guide-ways to support the frame in said movement, means to lock the frame against forward, rearward, or upward movement, means to hold said locking means to operative position, and means to hold said frame normally elevated and permit the depression of the forward end thereof under impact of a contacting body.

2. A car fender comprising a frame adapted for movement, guide-ways to support the frame in said movement, means to lock the frame against forward, rearward, or upward movement, means to hold said locking means to operative position, and a weight to hold said frame normally elevated and permit the depression of the forward end thereof under impact of a contacting body.

3. A car fender comprising a rectangular slatted frame adapted for movement, guideways to support the frame in said movement, a cross-bar disposed above the frame and formed with an aperture, an anchor pin adapted to pass through said aperture and abut the upper and rear face of one of the frame slats, and a locking pin to hold said anchor pin to operative position.

4. The combination with a car fender as described, of a pin held in a recessed portion of the cross piece above the rear end of the fender by a lock pin in such manner as to prevent the car fender sliding back and forth, a projection on said first mentioned pin arranged to hold the fender down, and means for removing said pin and lock pin when desired.

In testimony whereof, I affix my signature in presence of two witnesses.

EDWARD BARRETT.

Witnesses:
 A. J. MATTER,
 GEORGE I. BROOKS.